Nov. 8, 1927.

F. H. ROYCE 1,648,061

MOUNTING ENGINES IN VEHICLES

Filed Oct. 28, 1924    4 Sheets-Sheet 1

Inventor
Frederick Henry Royce
By Mason Fenwick & Lawrence,
Attorney

Nov. 8, 1927.  
F. H. ROYCE  
1,648,061  
MOUNTING ENGINES IN VEHICLES  
Filed Oct. 28, 1924    4 Sheets-Sheet 2
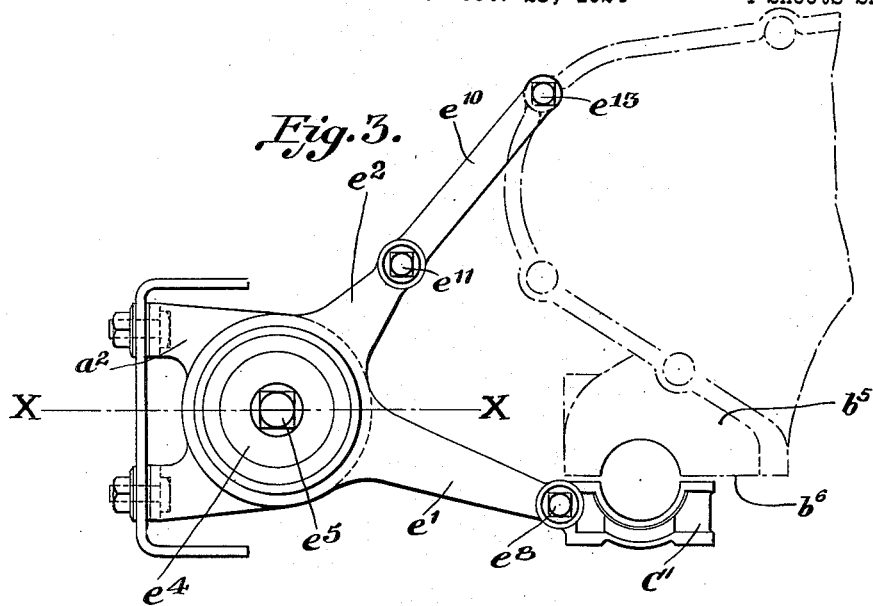
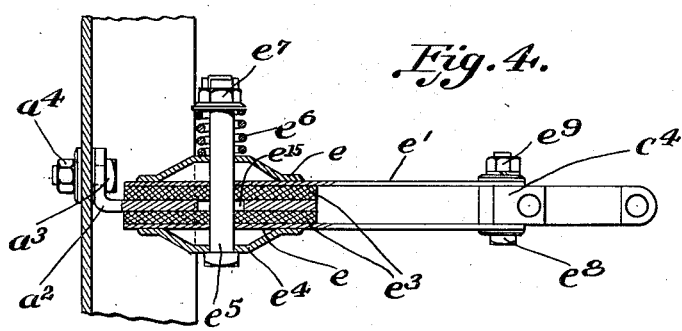
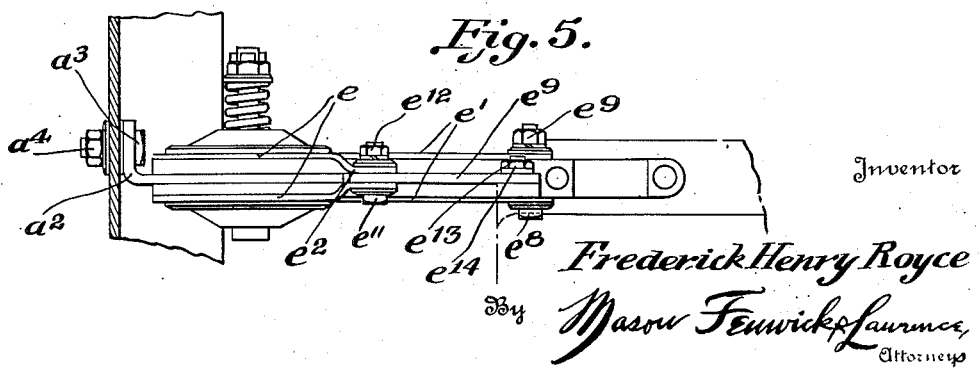
Inventor  
Frederick Henry Royce  
By Mason Fenwick & Lawrence  
Attorneys Inventor
Frederick Henry Royce

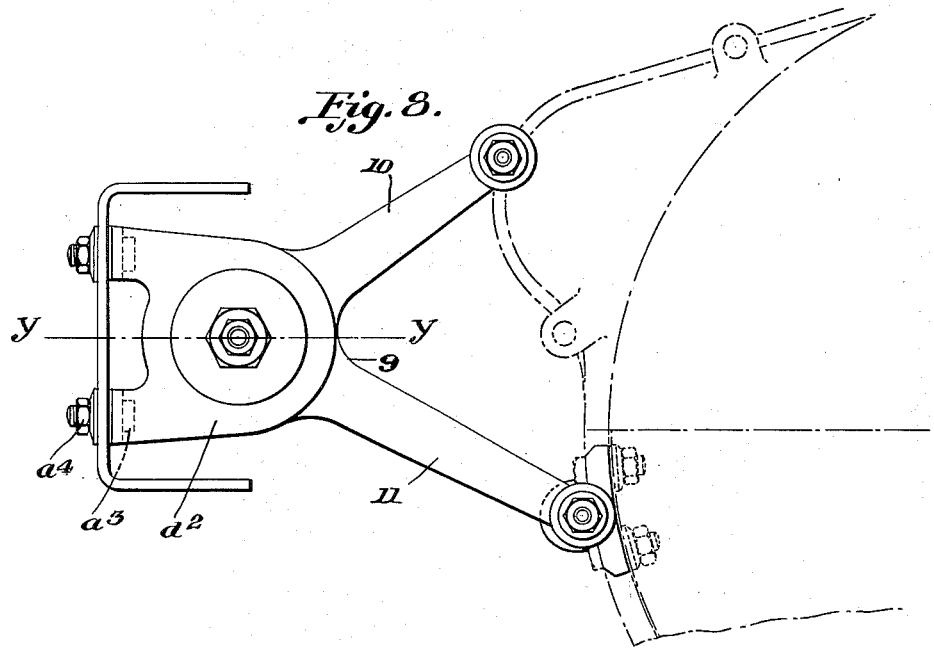
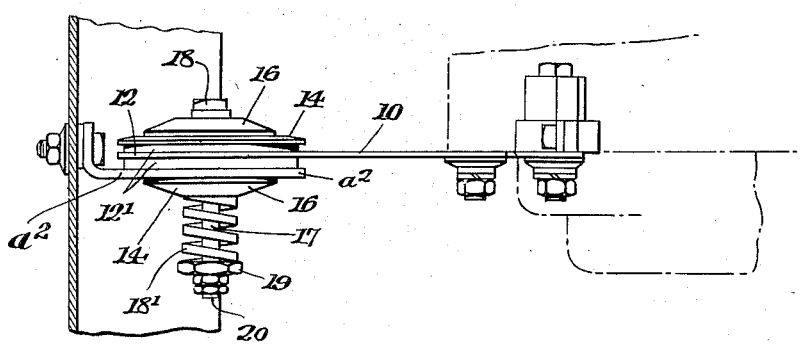
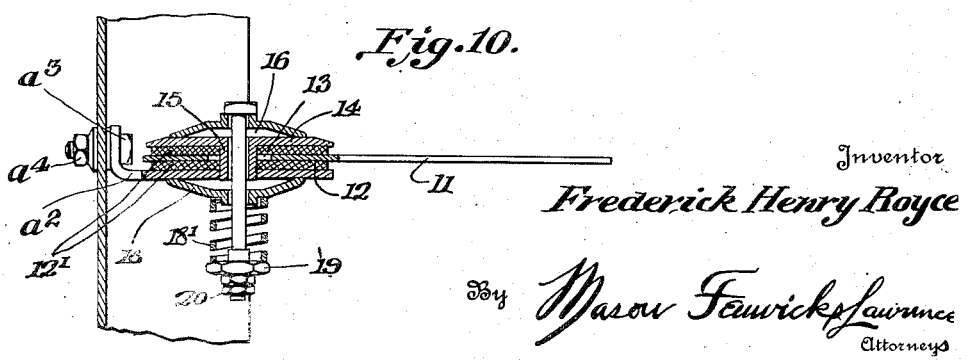

Patented Nov. 8, 1927.

1,648,061

UNITED STATES PATENT OFFICE.

FREDERICK HENRY ROYCE, OF WEST WITTERING, NEAR CHICHESTER, ENGLAND, ASSIGNOR TO ROLLS-ROYCE LIMITED, OF DERBY, ENGLAND.

MOUNTING ENGINES IN VEHICLES.

Application filed October 28, 1924, Serial No. 746,432, and in Great Britain October 31, 1923.

This invention has reference to internal combustion engines for road vehicles and has for its object to damp out, or minimize, torsional vibrations. It is applicable to vehicles in which the engine is supported in the frame by a suspension which admits of relatively free rotational movement about a longitudinal axis within limits at one end.

According to this invention apart from, and in addition to, the supports of the engine in the frame of the vehicle an anti-vibration friction device is introduced one side of which is connected to the engine and the other side to the frame of the vehicle. For example the vehicle can be constructed as follows: Arms or brackets bolted or otherwise secured to the engine extend out on each side to, or towards the side girders of, the frame, where they terminate in a disc or other suitably shaped end, in a vertical plane with a hole through the centre. These discs are associated concentrically with other discs or suitably shaped members rigidly secured to the frame, and preferably located in the channel of the side girder (with intervening discs of friction material). The discs are bolted together and by means of an axially operating spring are in frictional engagement. The hole through the disc or end of the arm or bracket extending from the frame is large enought to allow considerable clearance between it and the securing bolt.

In the accompanying drawings Figures 1 to 5 inclusive illustrate an example of my invention where the engine is suspended on the three point system and Figs. 6 to 10 inclusive where the engine is supported on a four point system but suspended at one end by elastic devices.

Figure 1:
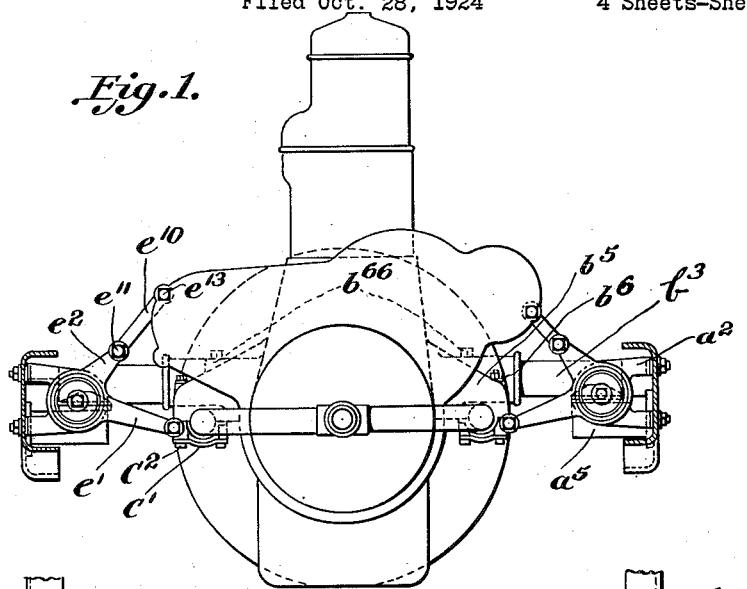
Figure 2:
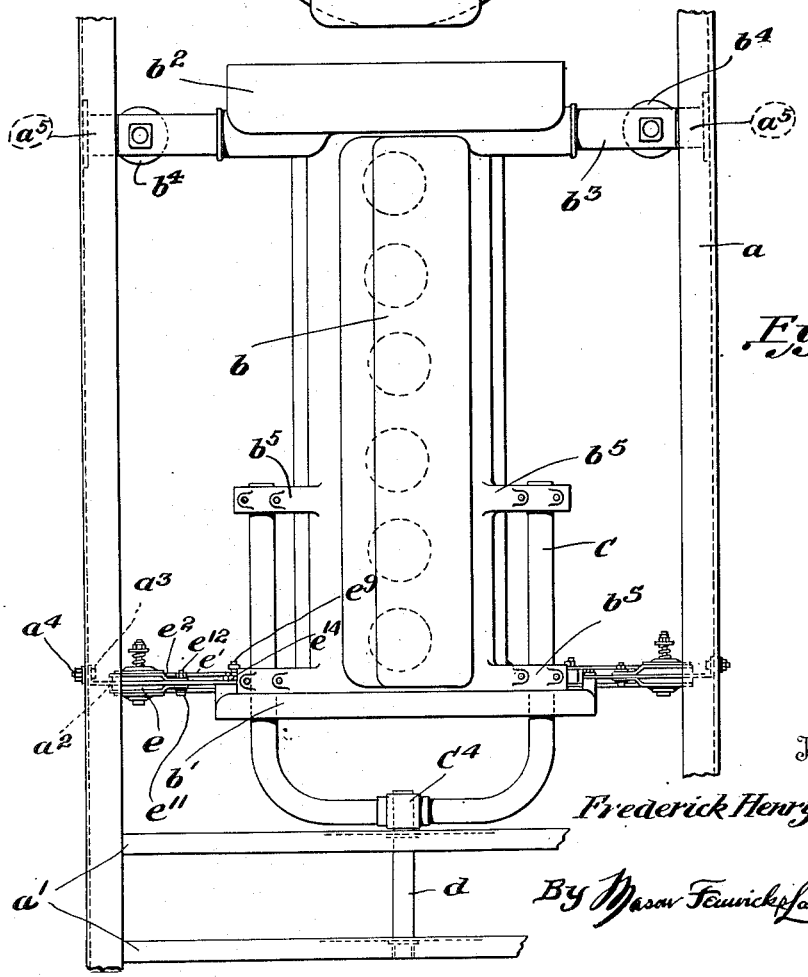
Figure 6:
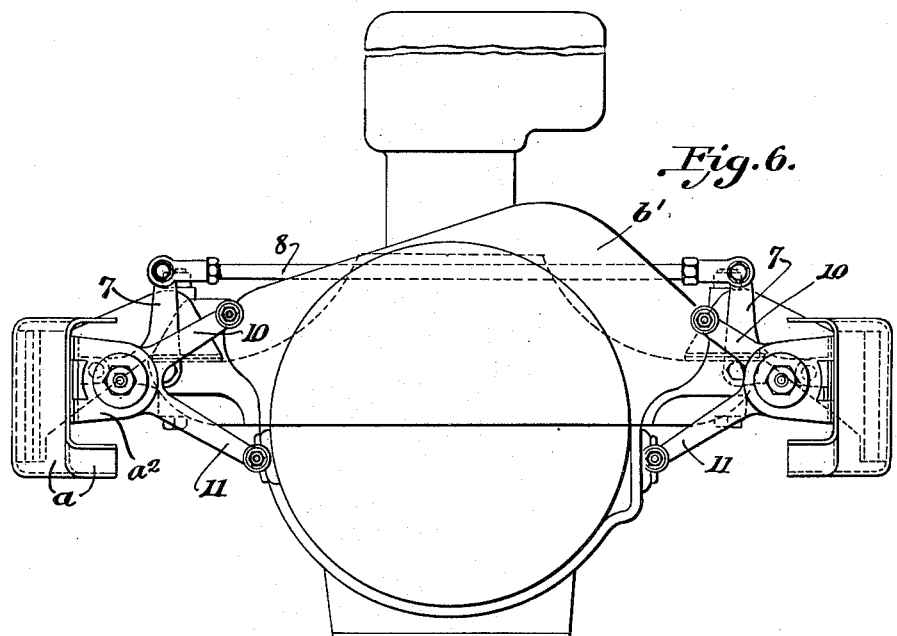
Figure 7:
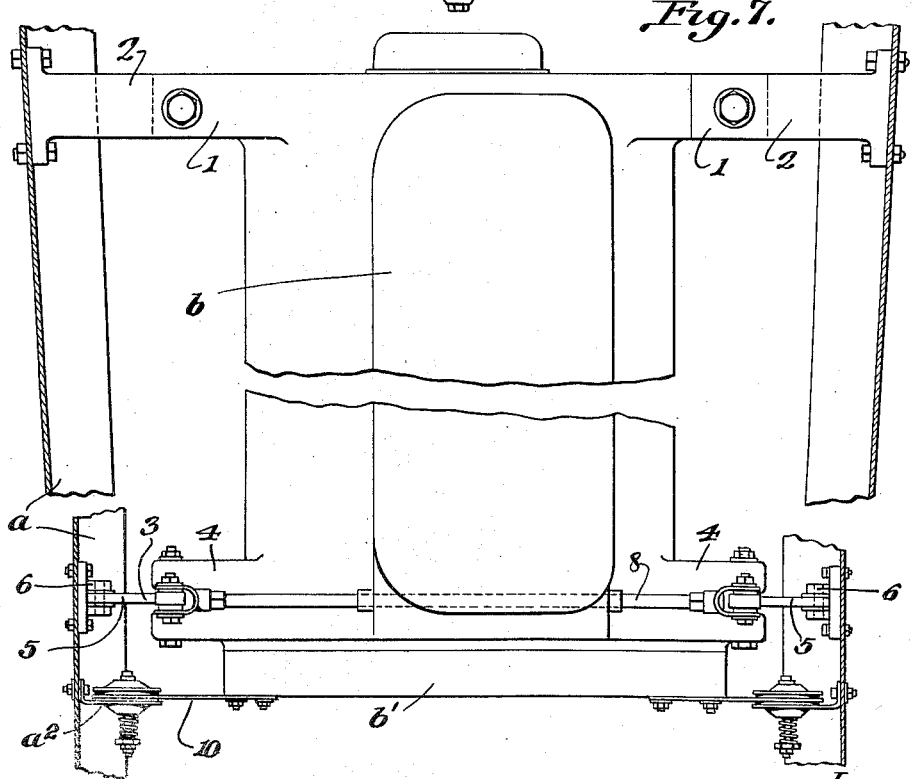

Referring to Figures 1 to 5, Fig. 1 shows a front end elevation of the engine with the front cross members of the frame removed. Fig. 2 is a plan view of Fig. 1, Fig. 3 an enlarged front end elevation of one vibration damper, Fig. 4 a section on line XX of Fig. 3, and Fig. 5 a plan view of Fig. 3. Fig. 6 shows a front end elevation of the engine with the front cross members removed. Fig. 7 is a plan view of Fig. 6. Fig. 8 is an enlarged front end elevation of one vibration damper. Fig 9 is a plan view of Fig. 8 and Fig. 10 is a section on line YY of Fig. 8 viewed from above.

Referring to Figures 1 to 5, inclusive, $a$ is the frame, $a^1$ are two cross members, $a^2$ are brackets in shape of a disc with projecting arms, secured by bolts $a^3$ and nuts $a^4$ to the side members. $a^5$ are brackets also secured to the frame by bolts and nuts (not shown), $b$ is the engine, $b^1$ the timing case, $b^2$ the fly wheel case, and $b^3$ are brackets extended from the engine crank case with flat feet $b^4$ which rest on and are bolted to the brackets $a^5$. $b^5$ are four brackets extended from the engine crank case with formed thereon bosses $b^6$ and $b^{66}$ through which are holes to receive bolts hereinafter referred to. $c$ is a U shaped tubular member rigidly secured to the four brackets $b^5$ by the caps $c^1$ which are secured to said brackets $b^5$ by bolts $c^2$ and nuts $c^3$ and has an eye $c^4$ at the center thereof. $d$ is a tubular member bolted to the cross members $a^1$ and passing through the eye $c^4$ (making therewith a rotatable fit). $e$ are two flat metal members preferably made of pressed steel each being in shape a disc with two extended arms $e^1$ and $e^2$, and with holes through the middle of the disc and through the ends of the arms to receive bolts hereinafter referred to. The arms $e^1$ are in the same plane as the disc parts, but the arms $e^2$ are set towards one another as indicated in Figure 5. $e^3$ are friction washers, $e^4$ are metal washers, $e^5$ is a bolt, $e^6$ is a spiral spring, and $e^7$ is a nut, by the screwing up of which the desired pressure between the discs is attained. The arms $e^1$ are bolted to a perforated lug on the cap $c^1$ by means of the threaded bolts $e^8$ and nut $e^9$. The arms $e^2$ are bolted to a plate $e^{10}$ by means of the bolt $e^{11}$ and nut $e^{12}$, and the plate $e^{10}$ is secured to a lug extended from the timing case by a bolt $e^{13}$ and nut $e^{14}$.

Referring to Figures 6 to 10, $a$, $a^2$, $a^3$, $a^4$, $b$ and $b^1$ indicate the same parts as, or similar parts to, those in Figs. 1 to 5.

The engine $b$ is rigidly secured at the rear end thereof to the side members $a$ by means of arms 1 formed integral with the engine case and bolted securely to the brackets 2 fixed to each side member $a$.

The front end of the engine is pivotally connected to the side members $a$ by means of the bell cranks 3, pivoted at their centers in bifurcated lugs 4 extending laterally from each side of the engine. The lower arm 5 of each bell crank has its free end pivoted to a bracket 6 fixed to a side member $a$, and has the free end of its other arm 7 pivoted to one end of a connecting rod 8, the length of which between its pivot ends obviously determines the height at which the front end of the engine is suspended relative to the frame.

In order to dampen the oscillatory movements of the front of the engine on its suspension, frictional damping devices somewhat similar to those illustrated in Figs. 1 to 5 are used. The link $e^{10}$ of Fig. 1, is essential in the arrangement shown in Fig. 1, since the front end of the engine is centrally pivoted and it is necessary to provide for a slight rotation of this end. The suspension shown in Figs. 6 and 7 restricts the front end to a swaying rather than a pivotal movement relative to the frame, and the pivoted link connection is not essential.

In each of the damping arrangements shown in Figs. 6 to 10, a single forked plate 9 is bolted rigidly by its branches 10 and 11 to the side of the engine, and has its free end formed as a disk 12 provided with a central aperture 13. The free end of the plate $a^2$ extends parallel to disk 12 and has a friction disk 12' interposed between it and disk 12.

In order to clamp the friction disk 12' between the plate $a^2$ and disk 12, a second friction disk 12' is positioned on the other side of disk 12 and a metal washer 14 having an apertured hub 15 is used as a clamping plate for pressing the friction disks and disk 12 against plate $a^2$, the plate $a^2$ and disks 12' are centrally apertured to receive snugly the hub 15 of washer 14, and the aperture 13 in disk 12 is made substantially larger than hub 15 to permit the disk 12 to slide between the friction disks 12'.

Spring washers 16 apertured at their centers are arranged on the washer 14 and plate $a^2$, and a bolt 17, passing through the alined apertures of washers 16 and hub 15, has its head 18 seated on one of said washers. The shank of bolt 17 extends beyond the other washer 16 and has a coil compression spring 18' interposed, around said shank, between the adjacent washer 16 and a pressure adjusting nut 19 screwthreaded onto the threaded end of said bolt. Lock nuts 20 serve to secure the nut 19 in adjusted positions.

With apparatus as above described torsional vibration resulting from the well known reaction tending to rotate the engine round the crank shaft, and resulting vibrations set up in the frame, are eliminated or minimized.

Having now particularly described and ascertained the nature of my said invention, and in what manner the same is to be performed, I declare that what I claim is:—

1. Suspension means for an engine including a bracket secured to the said frame and carrying a frame plate, a bracket secured to the engine also carrying a plate, said plates arranged parallel to each other, a washer provided with a cylindrical projection and with an orifice extending through said washer axially of the cylindrical projection, friction plates disposed one on each side of the plate supported from the engine, said plates provided with aligned orifices adapted to receive the cylindrical projection on the washer, the orifice in one of the plates being of a diameter substantially larger than the diameter of said cylindrical projection and means for resiliently securing said plates, friction plates and washer together.

2. In a motor vehicle, the combination with a frame having a pair of side members, of an engine rigidly connected at its rear end to said side members, means pivotally connecting the front end of said engine to said side members, and connections extending laterally from each side of the front end thereof to each side member to dampen the pivotal oscillations of said front end relative to said members.

3. The combination set forth in claim 2 in which each of said connections includes a plate fixed to and extending laterally from one of said side members, a plate secured to said engine and extending laterally therefrom in parallelism with the first named plate, a friction disk between said plates, and means for clamping said disk between said plates to interpose frictional resistance to relative sliding movements between said plates.

4. In a motor vehicle, the combination with a frame having a pair of side members, of an engine rigidly connected at its rear end to said side members, means pivotally connecting the front end of said engines to said side members, and connections extending laterally from each side of the front end thereof to each side member to dampen the pivotal oscillations of said front end relative to said members, each of said connections including a plate fixed to and extending laterally from one of said members, a plate secured to said engine and extending laterally therefrom in parallelism with the first named plate friction disk between said plates, means for clamping said disk between said plates to interpose frictional resistance to relative sliding movements between said plates and means for adjusting the frictional contact between said plates and said disk.

5. In a motor vehicle the combination with a frame, having side members, of an engine having one end thereof rigidly secured to said side members and its other end pivotally connected thereto and means for dampening the pivotal oscillations of said other end comprising a plate fixed rigidly to one of said side members, a second plate secured to one side of said engine and in parallelism with the first named plate, a friction disk interposed between said plates, and means for clamping said plates and disk in frictional contact with each other, one of said plates being slidable relative to said disk and the other plate.

6. The combination set forth in claim 5, in which the last named means is adjustable to vary the frictional contact between said disk and plates.

In witness whereof I have signed this specification.

FREDERICK HENRY ROYCE.